Sept. 9, 1952  C. D. BUDELMAN  2,609,563
AUXILIARY ADJUSTABLE POT HANDLE
Filed June 20, 1949
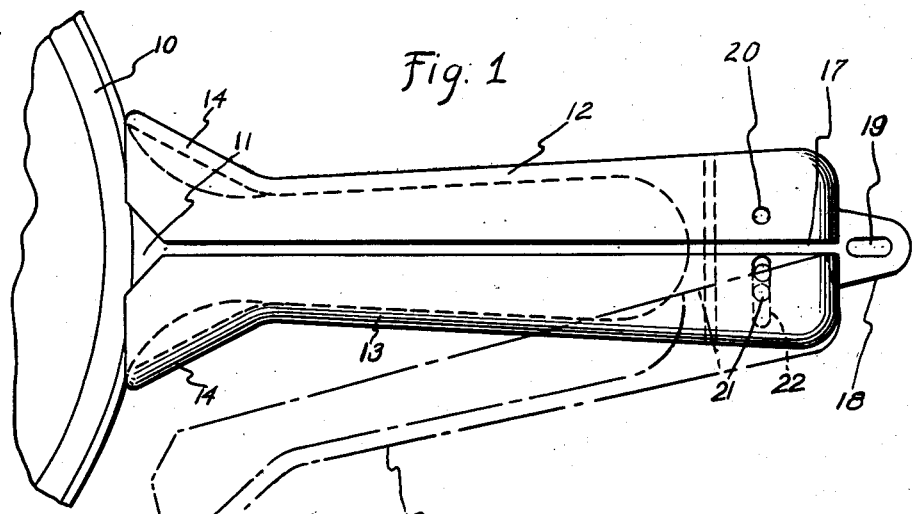
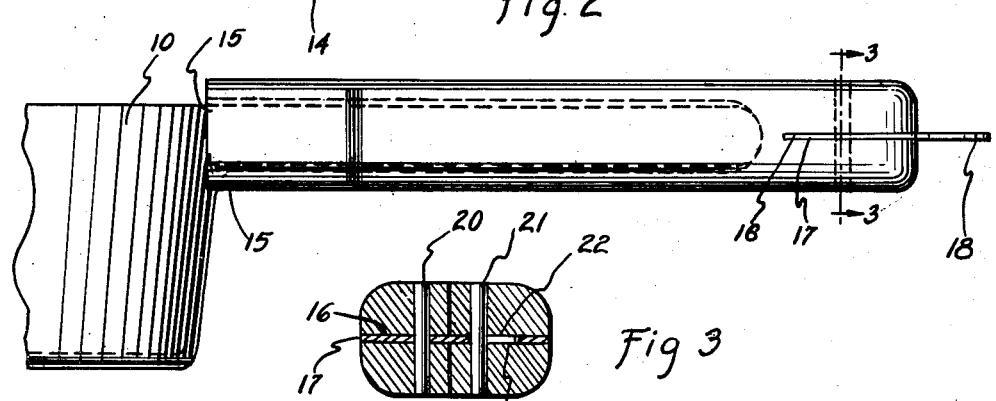
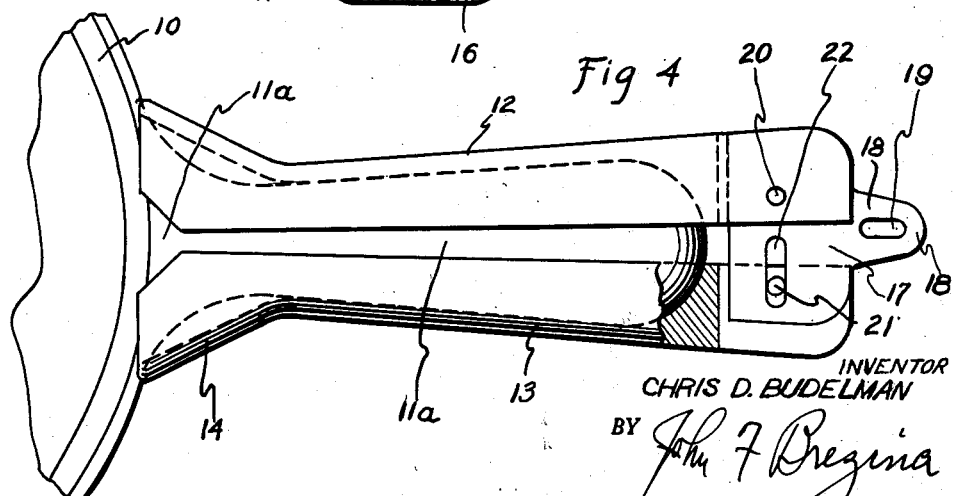
INVENTOR
CHRIS D. BUDELMAN
BY John F. Brezina
ATTORNEY Patented Sept. 9, 1952

2,609,563

UNITED STATES PATENT OFFICE 2,609,563

AUXILIARY ADJUSTABLE POT HANDLE

Chris D. Budelman, Portland, Oreg.

Application June 20, 1949, Serial No. 100,209

1 Claim. (Cl. 16—114)

My invention relates to a new and novel auxiliary handle for iron skillets or frying pans and the like.

It is an object of my invention to provide an auxiliary handle which will provide a heat insulator so that an iron skillet or the like may be conveniently removed from a range on which same has been heated.

It is appreciated that there have been numerous prior devices adapted for similar purposes, but none of the said prior devices have comprised the novel combination of elements on my device. None of said prior devices have been able to provide a continuous contact along the iron skillet handle engaging surfaces thereof to permit distribution of the load along the entire handle.

It is an object of my invention to provide an auxiliary handle which is adapted to permit the distribution of the load, of the utensil being carried, along the length of the handle.

It is a further object of my novel device to provide, in an auxiliary handle, a pair of handle members which are pivotable with respect to each other and which are adapted to be variably spaced from each other, as desired, depending upon the width or diameter of the handle of the utensil with which my device is to be used. Although prior devices have had two members comprising the auxiliary handle which were adapted to be pivoted with respect to each other, none of the prior devices have permitted a variable spacing of the members comprising the handle so that the said members could be uniformly spaced from each other along their entire length. In prior devices, no provision has been made for any movement of the member comprising the auxiliary handle, other than a pivotal movement. It should be understood that by only providing for pivoting of the handle member and not providing other means for spacing the members prior auxiliary handles would function efficiently only on one size iron skillet handle.

Other and further objects of my invention will become apparent from the following decription and appended claim, reference being made to the accompanying drawings and numerals of reference thereon.

On the drawings:

Fig. 1 is a top plan view of my novel handle showing same in engagement with the handle of an iron skillet, only a fragment of said skillet being illustrated, and showing in dotted lines one of the side members being pivoted and moved laterally.

Fig. 2 is a side elevation of my novel handle and showing same in engagement with the handle of an iron skillet, only a fragment of said pot being shown.

Fig. 3 is a vertical cross-sectional view taken substantially on the line 3—3 and looking in the direction of the arrows.

Fig. 4 is a top plan view of my novel handle showing same in iron skillet handle engaging positions, the iron skillet handle illustrated being of larger dimension than that shown in Fig. 1 and showing my novel handle adjusted for said larger iron skillet handle, parts of my novel handle being broken away for purpose of illustration.

Referring to the drawings, it will be seen that numeral 10 designates a skillet which may be of any variety of sizes or shapes and made of any appropriate material such as iron or steel. The iron skillet 10 has the usual handle 11 which may adopt a variety of dimensions depending upon the type and size of iron skillet used. My novel device, the auxiliary adjustable handle, is so constucted that regardless of the dimensions of the iron skillet handle 11 said device is adaptable for use therewith.

It will be seen that my novel handle comprises a pair of elongated members 12 and 13 each of which has a laterally extended flange 14. Each of the flanges 14 has a pair of normally vertically spaced recesses or grooves 15 which are illustrated in Fig. 2 and which are adapted to engage portions of an iron skillet which are present on certain designs thereof. The seating of portions of said iron skillet in the grooves or recesses 15, it will be understood, enables portions of the load carried by my novel handle to be better distributed throughout the entire handle.

As illustrated in Figs. 1, 2, and 4, each of the handles has an elongated trough or recess which provides an opening into which the handle 11 may seat and be engaged by the handle members 12 and 13. It will be noted by referring to the drawings that the troughs or depressions into which the handle 11 seats do not extend the entire length of the members 12 and 13 but terminate short of one end.

At the end of members 12 and 13 which is farthest from the iron skillet engaging flanges 14, each of said members has a slot or slit 16 which is horizontally aligned with the slot or slit 16 in the opposite auxiliary handle member.

As illustrated in Fig. 1, 2, 3, and 4, a preferably flat plate-like connector member, connector or plate 17, having an outwardly end extension or lug 18, is secured and mounted in said aligned slits or slots 16. The lug 18 preferably has an opening or aperture 19 which is adapted to facilitate the hanging of the handle on such an object as a nail or hook (not shown) when not in use. One of the handle members, preferably member 12, has a pair of vertically aligned holes or openings which are adapted to register with the corresponding hole or opening in the plate 17 and through which a pin or pintle 20 extends to provide a pivotal axis for handle member 12. It should be noted that in a preferred form which is illustrated herein, the pin or pintle 20 fits snugly within its respective openings or apertures in the handle member 12 and the plate 17 so that there will be no lateral movement of member 12 with respect to plate 17, and so that the movement of member 12 is limited to a pivotal movement. Handle member 13 has a pair of vertically aligned openings or holes in which a pin or pintle 21 is secured so that a pivotal axis is provided for said handle member 13. However, it should be noted that plate-like member 17 has an elongated slot 22 through which pin or pintle 21 passes and pin 21 and handle member 13 are laterally adjustable within the limits of said slots 22.

When it is desired to disengage the auxiliary handle from the iron skillet handle 11, the members 12 and 13 may be pivoted out of engagement with the handle 11; and in Fig. 1 I have illustrated in dotted lines handle member 13 pivoted and said member moved laterally with respect to the plate 17.

Referring to Fig. 4, it will be noted that the member 13 has been moved laterally to enable the auxiliary handle to become adapted to a larger size iron skillet or frying pan handle designated as 11a. By providing a member such as 13 which is not only pivotable, but movable laterally to space said handle member 13 from handle member 12, I am able to provide an auxiliary handle which will continuously engage an iron skillet handle along the greater portion of its length to thereby more evenly distribute the load brought to bear on members 12 and 13 and to thereby efficiently carry the load which is normally present on the usual iron skillet handle.

As many changes could be made in the above construction, and as many apparently widely different embodiments of my invention within the scope of the claim could be constructed without departing from the spirit and scope thereof, it is intended that all matter contained in the accompanying specification shall be interpreted as illustrative and not in a limiting sense.

I claim:

In an adjustable auxiliary handle for carrying iron skillets and the like, in combination, a pair of handle members having elongated cooperating channels and providing a chamber into which an iron skillet handle is inserted and at one end thereof each of said handle members having a normally horizontal slot; a connector in said slots and having a hole and an elongated aperture; a pin secured in one of said handle members and extending through and being pivotable in said hole; a second pin secured in the other of said handle members and extending through and being pivotable in said aperture, said handle members being laterally adjustable with respect to each other within the limits of said aperture.

CHRIS D. BUDELMAN.

REFERENCES CITED

The following references are of record in the file of this patent:

UNITED STATES PATENTS

| Number | Name | Date |
|---|---|---|
| 1,162,896 | Achberger | Dec. 7, 1915 |
| 1,512,197 | Borel | Oct. 21, 1924 |
| 1,837,232 | Reinhardt | Dec. 22, 1931 |
| 2,457,898 | Hummel | Jan. 4, 1949 |
| 2,478,529 | Farr et al. | Aug. 9, 1949 |